US008463941B1

(12) United States Patent
Welch et al.

(10) Patent No.: US 8,463,941 B1
(45) Date of Patent: Jun. 11, 2013

(54) CROSS-SESSION PROTOCOL ACCELERATION AND ITS APPLICATION TO STORAGE AREA NETWORK FILE SYSTEMS

(75) Inventors: William Welch, San Francisco, CA (US); Steven McCanne, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 252 days.

(21) Appl. No.: 12/140,184

(22) Filed: Jun. 16, 2008

(51) Int. Cl.
*G06F 15/173* (2006.01)

(52) U.S. Cl.
USPC .......................................... 709/239; 709/238

(58) Field of Classification Search
USPC .................................. 709/238, 239; 370/216
See application file for complete search history.

(56) References Cited

U.S. PATENT DOCUMENTS

| 5,754,774 | A | * | 5/1998 | Bittinger et al. | 709/203 |
|---|---|---|---|---|---|
| 6,178,461 | B1 | | 1/2001 | Chan et al. | |
| 6,415,329 | B1 | | 7/2002 | Gelman et al. | |
| 6,874,017 | B1 | | 3/2005 | Inoue et al. | |
| 7,120,666 | B2 | * | 10/2006 | McCanne et al. | 709/203 |
| 2004/0215746 | A1 | * | 10/2004 | McCanne et al. | 709/219 |
| 2008/0043622 | A1 | * | 2/2008 | Kamath et al. | 370/235 |

OTHER PUBLICATIONS

Amer, Ahmed et al., "File Access Prediction with Adjustable Accuracy," 2002, *Proceedings of the Performance, Computing, and Communications Conference 2002, on 21st IEEE International*, pp. 131-140.

Caceres, Ramon et al., "Web Proxy Caching: The Devil Is in the Details," Jun. 1998, *Proceedings of the Workshop on Internet Server Performance*, Madison, Wisconsin, pp. 111-118.

Deshpande, Mukund et al., "Selective Markov Models for Predicting Web-Page Accesses," 2004, *ACM Transactions on Internet Technology*, vol. 4, Issue 2, pp. 163-184.

Fan, Li et al., "Summary Cache: A Scalable Wide-Area Web Cache Sharing Protocol," Jun. 2000, *Proceedings of the IEEE/ACM Transactions on Networking*, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

(Continued)

*Primary Examiner* — Umar Cheema
(74) *Attorney, Agent, or Firm* — David Wright Tremaine LLP; Philip H. Albert

(57) ABSTRACT

Protocol acceleration is performed between clients and servers over a network wherein transport connections are established between clients/servers and/or their proxies for acceleration of traffic that uses certain protocols. A first transport connection for a first application protocol and a second transport connection for a second application protocol can be made between two proxies, wherein a client-side proxy is in communication with a client and a server-side proxy is in communication with a server, and the proxies use information from message payloads flowing between the client device and the server device over the first transport connection for acceleration of traffic over the second transport connection. Examples of transport protocols include a file server protocol and a storage access protocol. Cross-protocol acceleration can be expanded so that information obtained for one client on one protocol can be used to accelerate traffic for another client with the same or different protocol.

20 Claims, 9 Drawing Sheets

OTHER PUBLICATIONS

Griffioen, James et al., "Reducing File System Latency using a Predictive Approach," Jun. 1994, *Proceedings of the USENIX Summer 1994 Technical Conference on USENIX*, Technical Conference, vol. 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Padmanabhan et al., "Using Predictive Prefetching to Improve World Wide Web Latency," Jul. 1996, *ACM SIGCOMM Computer Communication Review*, vol. 26, No. 3, pp. 22-36.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer," May 2006, *Third Symposium on Networked Systems Design and Implementation (NSDI'06)*, San Jose, California.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

* cited by examiner

CROSS-SESSION PROTOCOL ACCELERATION AND ITS APPLICATION TO STORAGE AREA NETWORK FILE SYSTEMS

CROSS-REFERENCE TO RELATED APPLICATIONS

The present disclosure may be related to the following commonly assigned applications/patents:

U.S. Pat. No. 7,120,666 entitled "Transaction Accelerator for Client-Server Communication Systems" (hereinafter "McCanne I");

U.S. Pat. No. 6,667,700 entitled "Content-Based Segmentation Scheme for Data Compression in Storage and Transmission Including Hierarchical Segment Representation" (hereinafter "McCanne II");

U.S. Patent Publication 2004/0215746, published Oct. 28, 2004 entitled "Transparent Client-Server Transaction Accelerator" (hereinafter "McCanne III");

U.S. Pat. No. 7,318,100 entitled "Cooperative Proxy Auto-Discovery and Connection Interception" (hereinafter "Demmer I");

U.S. Patent Publication 2008/0005274, published Jan. 3, 2008 entitled "Throttling of Predictive ACKs in an Accelerated Network Communication System" (hereinafter "Subbanna I");

The respective disclosures of these applications/patents are incorporated herein by reference in their entirety for all purposes.

FIELD OF THE INVENTION

The present invention relates generally to file system access optimized for constrained bandwidth and/or high-latency network paths, and more particularly to network file data manipulations that operate over two or more protocols.

BACKGROUND OF THE INVENTION

Different networks can have different characteristics such as the bandwidth available, the latency of a link of that network, the reliability of the links in the network, etc. Difficulties often arise when protocols and operations that are designed for high-bandwidth, low-latency, robust networks are attempted over low-bandwidth, high-latency and/or unreliable networks, but sometimes those protocols and operations need to be used. For example, computer users in an organization might need to access, from their local desktop computers, files, data, etc. that is obtained through a network. Many of the protocols that are designed for local area networks assume that the network has high bandwidth and low latency, yet those protocols often are used over wide area networks, which might have lower bandwidth and higher latency. A local area network (LAN) is but one example of a high-bandwidth, low-latency network, while a wide area network (WAN) is but one example of a low-bandwidth, high-latency network. Of course, there may be LANs and WANs that are such that the WAN performs better than the LAN, but these examples are used herein nonetheless.

Typically, devices that connect to a network operate in a client-server mode, wherein one device, the client device, initiates a transaction with a server, while a server waits for requests from client devices and responds to those requests. Thus, a transaction can be a client making a request of a server and the server responding to that request.

Where the network path between a client and a server includes LAN portions and WAN portions, a transaction accelerator pair might be used to accelerate the WAN portion. Examples of such transaction accelerators are described in McCanne I and McCanne III. Transaction accelerators have also been recently called by other names, such as WAN accelerators, WAN optimizers, WAN optimization controllers (WOCs), wide-area data services (WDS) appliances, WAN traffic optimizers (WTOs) and so forth. In recent times, transaction acceleration has also been called transaction pipelining, protocol pipelining, request prediction, application flow acceleration, protocol acceleration, and so forth. Herein, the terms transaction acceleration and protocol acceleration are used interchangeably, unless otherwise indicated.

Parallel Access to Network File Systems

Traditional network file access protocols allow a file system client to access a file server over a network. Such protocols include the Network File System (NFS) originally proposed by Sun Microsystems in the 1980's and the Common Internet File System (CIFS) utilized in Microsoft's Windows operating system and implemented in various other storage systems such as the well-known, open source Samba server. Details of NFS are shown in R. Sandberg, D. Goldberg, S. Kleiman, D. Walsh, and B. Lyon, "Design and Implementation of the SUN Network File System", in Proceedings of the Summer 1985 USENIX Conference, 1985.

Traditionally, these protocols require that all client accesses to the file system occur through a single network endpoint at the file server. This requirement creates a performance bottleneck at the file server because all I/O (input/output) operations are handled by a centralized server. To facilitate scaling, and to allow a large common storage pool to be easily allocated to different server functions, large capacity network file systems have been built on locally networked clusters of storage targets that allow block-level access to their data, so-called storage area networks (SANs). SANs offer high-speed parallel access to large amounts of block-level data, but do not export an actual file system. It is left to a network file server to organize a file system on top of these block storage devices and to mediate client access to those devices. In this approach, the benefits of high-speed parallel access to a SAN's storage targets are seen only by the file server, not the file system clients directly.

A recently proposed architecture for network file systems called "parallel NFS" or pNFS attempts to relieve the file server bottleneck by separating, at least in part, the file system's control and data flows and by leveraging the scalability of a SAN. pNFS is a sub-protocol of the recently ratified version 4 of NFS. NFSv4 is described in "NFSv4 Minor Version 1, Internet Draft", draft-ietf-nfsv4-minorversionl-02.txt and pNFS is described in D. Black and S. Fridella, and J. Glasgow, "pNFS Block/Volume Layout", NFSv4 Working Group, Internet Draft, draft-ietf-nfsv4-pnfs-block-06.txt, February 2008 (hereinafter "Black et al."). In the examples used herein, NFS version 4 is referred to as "NFSv4" while NFSv4 with pNFS extensions is referred to simply as "pNFS" for readability. NFSv4 supports different variants of pNFS and there is currently work underway within the IETF to standardize one or more such variants.

In pNFS, the file system client sends control traffic to the file server control device called the "controller" and, in parallel, accesses one or more storage "targets" directly over a SAN to get block-level data. In this example, the file system client would communicate simultaneously with the file server controller via NFS and its pNFS extensions and with the storage target over a SAN protocol. Examples of SAN protocols include the Fibre Channel Protocol (FCP) or the Internet Small Computer Systems Interface (iSCSI), the latter of which is described in J. Satran, K. Meth, C. Sapuntzakis, M.

Chadalapaka, and E. Zeidner, "Internet Small Computer Systems Interface (iSCSI)", Request for Comments (RFC) 3720, April 2004.

Even if pNFS/iSCSI is available, a client might still perform normal NFS I/O over the controller connection, but enhanced performance is achieved when the client interacts with the storage target directly using pNFS. In iSCSI terminology, the client component that interacts with the storage target is called the "initiator". This dual-connected approach allows the storage and bandwidth scalability of the SAN to be extended to file system clients, possibly over disjoint networks from the control connection to the file server. A SAN file system thus is a network file system based on split data/control channels. A SAN file system might use protocols for the control channel and the data channel that are also used for other communications outside the use of a SAN file system, such as to support other sorts of networked storage clusters. The data need not be strictly block-oriented, but might be object-oriented as described in B. Halevy, B. Welch, and J. Zelenka, "Object-based pNFS Operations", NFSv4 Working Group, Internet Draft, draft-ietf-nfsv4-pnfs-obj-05.txt, February 2008 and related documents.

In this pNFS/iSCSI architecture, a file system client interacts with the controller to learn where and how to make direct storage accesses for a particular file by through the use of "layouts", wherein a layout describes the mapping between a file and its underlying representation on a disk-based storage subsystem and is typically organized as an ordered list of block storage addresses corresponding to particular file byte ranges or "extents". In order to operate directly against the SAN volume, a file system client requests from the file system controller a layout for a particular extent of a file. Once obtained, the client can perform I/O with respect to that extent by performing reads and/or writes directly to the storage subsystem using the block addresses with respect to a target indicated in the layout.

There are various types of layouts permitting read-only access, read-write access, and so forth. These access modes are explicitly indicated in the layout grant messages issued by the controller. A layout may be held across multiple open/close sequences so long as it remains valid. Should the underlying mapping of a file's data change, the controller sends invalidating messages to any clients holding affected layouts.

Unlike a file system, which provides very fine-grained access control and permissions for files, SAN volumes typically include only very coarse-grained access control. For example, in a file system, a file is typically owned by a particular user and that user can specify who and how others can modify the file, all on a per-file basis. However, a storage target has no notion of files. Instead, a storage array typically implements a very rudimentary mechanism dictating which servers can connect to what logical units (LUNs) on what targets. As such, a SAN file system must assume that the file system client is a trusted entity and can be depended upon to perform only those I/O operations that have been authorized by the file system controller. In fact, in such deployments, the file system client typically is implemented within a trusted operating system service that is tightly managed and controlled by a system operator.

Concurrent Access to SAN File Systems

In addition to describing the location of file data, layouts also serve as grants of read or write access permission to the data by the file server. This is how the controller coordinates simultaneous access to a file or extents within a file, and assures that multiple clients receive a consistent view of a shared extent. Multiple readers of a given extent are accommodated by the controller issuing multiple layouts granting read access. Exclusive write access is enforced by the controller issuing a single read-write layout. Should another client request conflicting access to the same storage, the controller first recalls the original layout, giving the previous client the opportunity to write back any pending changes, before granting the new layout request. In this case, the clients must synchronously perform all I/O operations against the centralized volume in order to achieve consistent file system operations. This is analogous to the "opportunistic locking" mechanism used in the CIFS network protocol, but at the granularity of file system blocks rather than whole files, with grant coordination handled by the controller and access enforcement handled by both the controller and the data storage devices.

Accessing a SAN File System over a WAN

The protocols for network file systems, and consequently SAN file systems, have been customarily designed assuming there is a Local Area Network (LAN) link or similar high-performance network between the client and the file server. That is, the intervening network path is assumed to have high bandwidth, low latency, and negligible packet loss rates. Typically, many of the protocol message exchanges between a file system client and server are serialized and result in a "chatty" interaction over the network as efficient use of the network is not required. While a given request or acknowledgement is in flight, processing often must be suspended until the reply message has been received. Some transactions may require several such back-and-forth exchanges. The sustained data transfer rate that a client and server attain over a network link, taking into account such request/response serialization, is commonly called the system's or application's throughput. On a low-latency LAN, this serialization often has a negligible impact on throughput, and aggregate rates are largely determined by the bandwidth at which individual blocks of data can be transferred through the system end points and across the network path.

However, it is often desirable to be able to access such file systems across a Wide Area Network (WAN) or other network that has similar characteristics. An example is where a business' information infrastructure is centralized but must be made accessible to remote offices or users. Likewise, in a scientific computing application (e.g., data analysis for oil exploration, simulations for drug design, weather and climate modeling, and so forth) very large data sets are manipulated through computational processes that are distributed across many nodes and, in certain cases, coordinating massive numbers of computation nodes across a WAN becomes a desirable configuration. In such a scenario, it is desirable to have computational nodes in different geographic regions accessing a shared centralized storage pool and it is important for such WAN-based storage access to be as efficient as possible.

WAN links typically operate with bandwidths that are a few orders of magnitude less than LANs and latencies that are a few orders of magnitude more than LANs. In many cases, higher WAN bandwidth can be purchased, but little if anything can be done about network latency. Because of the request-response nature of network file system protocols, network latency is often the more constraining limitation imposed upon system throughput compared to bandwidth.

In a sequence of exchanges in which latency dominates the transmission time (as can be the case with small messages like a request or an acknowledgement), a chatty protocol's throughput decays rapidly with increases network latency. In fact, it can be shown that throughput decays hyperbolically with respect to increasing network latency in some cases. For example, if network latency is doubled, then the performance of a latency-bound process is halved. Likewise, if network latency is increased one-thousand fold, as can happen when going from a LAN to a WAN, then performance is decreased by a factor of 1000. When latency is the bottleneck like this, increasing network bandwidth often has a negligible effect, if at all, on overall throughput.

Examples of such chattiness particular to SAN file system protocols include request/acknowledgement exchanges for block reads and writes, layout request/grant exchanges, controller recalls of prior grants, and synchronization points between client, file server, and data storage when a client's access permission for a given block of data must be verified at the time of access.

BRIEF SUMMARY OF THE INVENTION

Using systems and methods described herein, protocol acceleration is performed between one or more client and one or more server over a network wherein transport connections are established between clients/servers and or their proxies for acceleration of traffic that uses certain protocols. In embodiments of the present invention, a first transport connection for a first application protocol and a second transport connection for a second application protocol are made between a client-side proxy and a server-side proxy, wherein the client-side proxy is in communication with a client and the server-side proxy is in communication with a server, and the proxies use information from message payloads flowing between the client device and the server device over the first transport connection for acceleration of traffic over the second transport connection. Examples of first and second transport connections include a file server protocol and a storage access protocol.

In various embodiments, the cross-protocol acceleration can be expanded so that information obtained for one client on one protocol can be used to accelerate traffic for another client with that same protocol or a different protocol.

In various embodiments, the proxies can perform specific steps, such as accelerating grant requests that overlap conflicting grants of others client by predicting and issuing recall messages to the grant holder if the grant holder and the requester share a client proxy engine. In various embodiments, client requests can be delayed by an engine to allow for an existing grant holder to respond to a predicted recall message and issued a layout return. In various embodiments, a client-side engine might accelerate a grant request for a range that is contained within the grant of another client, or within the union of other clients' grants, by predicting a successful grant message based on the existing grant or grants. In various embodiments, with proper controls, an engine can support an arbitrary number of clients sharing read-only layouts that overlap with at most one read-write layout.

The following detailed description together with the accompanying drawings will provide a better understanding of the nature and advantages of various embodiments of the present invention.

DETAILED DESCRIPTION OF THE INVENTION

Figure 1:
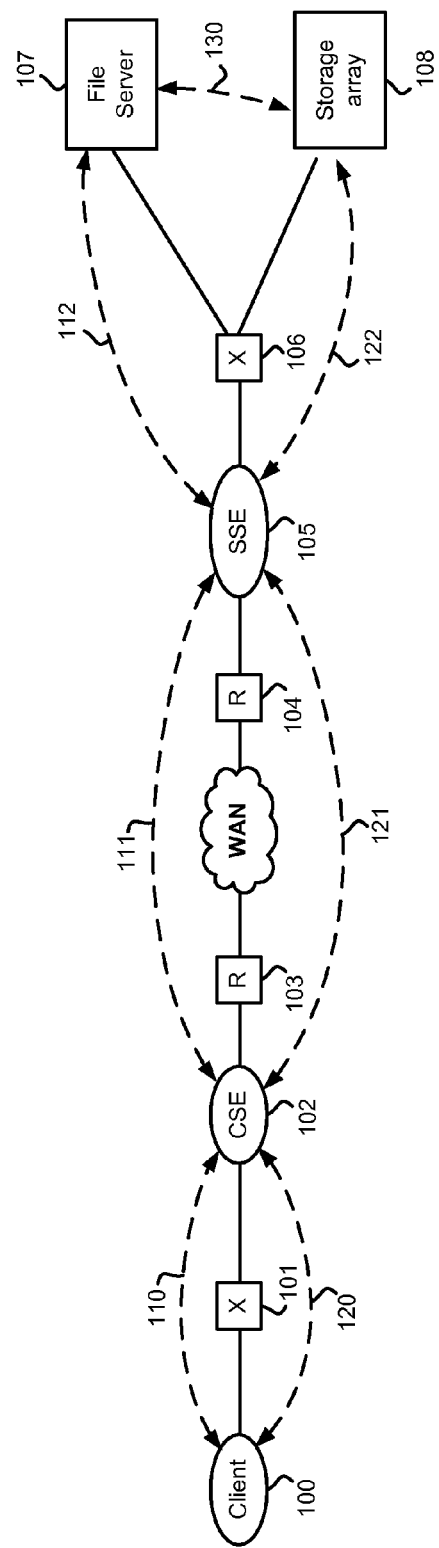
FIG. 1 is a block diagram illustrating a network environment in which the present invention might operate.

The present invention has many applications, as will be apparent after reading this disclosure. In describing embodiment of system and/or methods according to the present invention, only a few of the possible variations are described. Other applications and variations will be apparent to one of ordinary skill in the art, so the invention should not be construed as narrowly as the examples, but rather in accordance with the appended claims.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc. initiating the transaction is referred to as the "client" and the computer, computer device, etc. that responds, or is expected to respond, is referred to as the "server". Data can flow in either direction. For example, a file system client might initiate a transaction by requesting a file read. The corresponding data will be returned from the server responding to the request, so in that case, the bulk of the data flows from the server to the client. However, where a client initiates a file write transaction, the bulk of the data flows from the client to the server, either as part of the initial request or as subsequent messages.

A transaction can be in multiple parts, but in a simple transaction, a client sends a request (data, a message, a signal, etc., explicitly being the request or indicative of or representing of the request) to a server and the server responds with a response (data, a message, a signal, etc., explicitly being the response or indicative of or representing of the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to here as "nodes" with a channel assumed for communication between the nodes.

A transaction might begin with a client at one node making a request for file data directed to a server at another node, followed by a delivery of a response containing the requested file data. Other transactions might be a request for a specific part of a file, all the file, all or some of another data construct, or a transaction might relate to data flowing from the requestor or relate to a command Examples of transactions include "read a block", "read a file", "read a stream", "write a block with this data" (an example of data flowing from the requestor), "perform a calculation on this data", "get an e-mail with these characteristics", "send an e-mail", "check for new emails", "list directory contents", etc.

Some transactions might involve large amounts of data flowing in one direction or both directions. Some transactions might even involve interactions having more than one requestor and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information. In some cases, one device might be a client and a server, possibly in two transactions between two devices wherein one device is a client for one of the transactions and the other device is the client for the other transaction.

Using some of the systems described herein, client access to a server (and vice versa where needed), can be "tunneled" through transaction accelerators that map transactions onto sequences of variable-length segments with content-induced segment cut points. The segments can be stored at various places, typically within high-speed access of both the clients and the servers, with the segments stored using a scalable, persistent naming system. The segments can be decoupled from file-system and other system data blocks and structures, so that a matching segment might be found in multiple contexts. Instead of caching files, blocks, or other system dependent constructs, segments can be stored and bound to references that are used to represent the segment contents.

Transaction accelerators (or "accelerators" for short) are interposed in or near a network path between one or more clients and one or more servers. In some implementations, the accelerator is implemented entirely in software, while in other implementations the accelerator might be implemented in hardware, firmware or some combination of hardware, firmware and/or software. For illustration purposes, accelerators are shown in the figures as hardware boxes, but it should be understood that the accelerator might be software running on a general-purpose computer or using the computing facilities of other devices on the network. For example, a special router or switch might be devised that runs the accelerator in software in addition to its regular function. In a specific embodiment, a dedicated accelerator appliance is deployed in the network infrastructure between client and server sites and might be based on the Linux™ operating system.

As will be described herein, the accelerators reduce bandwidth usage and reduce latency for transactions between clients and servers. Such transactions might include copying a file from a distant file server to a local storage device, backing up remote file servers to a main data center storage device, sending a very large CAD file to a colleague over a large distance, etc. As should be apparent from this description, transactions need not be limited to file related activities.

As used herein, "near" may refer to physical proximity, but can also refer to network proximity. Network proximity relates to performance attributes. As an example, two nodes of a LAN might be considered more near than two nodes separated by a slow network channel. Often is the case that large physical distances do not result in network proximity, but there are examples where two nodes can be physically close but faraway in network terms and where two nodes can be physically far away but relatively close in network terms. Preferably, accelerators are positioned to be in network proximity with the nodes that seek a benefit from the accelerators.

FIG. 1 is a block diagram of a networked client-server system according to embodiments of the present invention, where such transactions might occur. FIG. 1 is described in more detail below, along with related figures.

In various embodiments, the accelerator is a transport-level proxy that conceptually operates in pair-wise configurations, with one accelerator situated near one or more servers (the "server side" accelerator) and another situated near clients (the "client-side" accelerator). Accelerators communicate with one another in a paired fashion, i.e., a transaction between one client and one server might be accelerated using a particular client-side accelerator and a particular server-side accelerator. Accelerators might be clustered and meshed across a WAN, possibly allowing any accelerator to communicate directly with any other accelerator. While one accelerator might be described as a client-side accelerator and another accelerator described as a server-side accelerator, it should be understood that accelerators can be symmetric, such that data could be accelerated from the client to the server or from the server to the client. In addition, a given accelerator could be a client-side accelerator for one transaction and a server-side accelerator for another transaction, possibly involving the same network devices.

Accelerators can intercept client-server connections without interfering with normal client-server interactions, file semantics, or protocols. All client requests can be passed through to the server normally, while relevant traffic is optimized to improve performance.

Additionally, as described below, a client-side engine can comprise a plurality of accelerators, for one or more protocols and a server-side engine can also comprise a plurality of accelerators for one or more protocols. These engines include modules, software, and/or hardware that allows for cross-protocol acceleration.

Examples of client-server protocol or transaction acceleration and accelerators are shown in McCanne I, McCanne II and McCanne III. With the use of intermediaries or proxies, information learned by one or more intermediaries or proxies between a client and server can be used to determine when and how transactions may be accelerated by predictively issuing requests on behalf of the client before the client issues the request, along with other steps. In doing so, for example, the intermediary or proxy can perform multiple requests against the server in parallel or over a LAN and bundle those results in a single round-trip, or small number of round-trips than would otherwise be required. Such techniques are effective at eliminating many of the WAN round-trips between a client and server and they substantially improve client-server protocol performance. When combined with a data reduction technique as described in McCanne II, oftentimes performance of a client and server over a WAN approaches the performance attainable over a LAN.

Cross-Protocol Acceleration

Similar benefits can be obtained where file system transactions require two or more distinct protocols, which is the case for a SAN file system, which uses a file system client, a hybrid file system and a storage target, when connected by a network link having challenging bandwidth and/or latency characteristics.

As an example of a single-protocol transaction, a proxy or set of proxies that performs transaction acceleration for a CIFS session would utilize information only from a given CIFS session exclusively for determining when and how client-server transactions can be accelerated or pipelined. In the case of CIFS, based on the client-server session state and certain actions such as a client opening a particular file, a transaction accelerator might attempt to issue file read-requests in advance of the actual read-requests made by the client. Similarly, in the case of an e-mail protocol, based on the client-server session state and certain actions such as a mail client downloading the body of a particular e-mail message, a transaction accelerator might attempt to fetch one or more attachments, if present, associated with that e-mail message in advance of the actual attachment-requests made by the client. In both of these scenarios, the transaction accelerator's decision is carried out based on information that occurs exclusively within the client-server application session that is being optimized.

However, certain other protocols are not by themselves comprehensively amenable to transaction acceleration utilizing request prediction, as the semantics of the protocol imposes challenging constraints on the ordering and timing of client-server requests. For example, iSCSI provides access to raw disk targets by encapsulating SCSI command requests and responses over a TCP/IP client-server session made from one or more TCP transport connections. Using the iSCSI protocol, one or more iSCSI initiators can perform I/O operations against a storage target over an iSCSI connection. The semantics of such a system are defined such that when data is written to a particular block address in the target, then subsequent reads return the most recently written data.

Such semantics are relied upon by higher layers of system design that utilize such a storage subsystem. For example, a file system might be built on top of an iSCSI volume and the file system design relies upon a read returning the most recently written data. Similarly, a database might be layered on top of an iSCSI volume and the database's design would assume that a read would return the most recently written data.

Thus, for the case of iSCSI, applying transaction prediction to an iSCSI session traversing a WAN is difficult. For example, it would be tempting to design a transaction accelerator with logic that predictively issues a read-request for block K+1 (and perhaps block K+2, block K+3, and so forth) when it is observed that block K has been read by some client. However, this would violate the semantics of the storage subsystem because such optimizations can cause messages to be ordered differently. For example, consider the following sequence of events:

a) client 1 reads block K
b) a transaction accelerator fetches block K+1 on behalf of client 1
c) client 2 writes block K+1
d) client 1 reads block K+1
e) the accelerator returns the predicted response for block K+1 to client 1

Unfortunately, this sequence of steps results in client 1 reading the stale version of block K+1. Such an inconsistency can cause errors in a file system, database, or application that is built on top of a disk volume and expects the disk volume's semantics to remain intact.

In the general case, it is impossible for a transaction accelerator to infer when and if it is safe to perform such transforms without having any visibility into how and what actions the application, database, or file system is taking. Fortunately, in the case of a SAN file system, such additional information is present in other protocol messages outside of the iSCSI connection, and these auxiliary messages can be correlated to the requests and responses flowing between the client and the storage subsystem. An accelerator can exploit such information from one protocol (e.g., NFSv4 with pNFS extensions) to another protocol (e.g., iSCSI) in order to perform "cross-session protocol acceleration".

More generally, where a system is organized to have a file server protocol ("FSP") session to manage file-level operations (such as pNFS or others) and a storage access protocol ("SAP") session to read and write data (such as iSCSI or others), embodiments of accelerators described herein can accelerate transactions by accelerating multiple interrelated protocols simultaneously. An example of an FSP is NFS with pNFS extensions (i.e., NFS version 4) used to retrieve layout information for directly accessing a storage system using iSCSI as a SAP. Other examples of FSPs include CIFS, WebDAV and similar protocols. Other examples of SAPs include block-based storage access protocols such as iSCSI/OSD, Fibre Channel over IP and the like.

By intercepting FSP client-server transactions related to FSP file layout requests, grants and recalls and the like, a prediction engine can safely and accurately predict subsequent block-data transactions between the client and storage devices, and inject these into the transaction stream, for example using techniques described in McCanne III, to reduce latency when and if they are eventually actually issued by the client or server. When there are multiple file system clients coupled to a given client-side engine, the engine may use overlapping layout requests to further predict and accelerate layout grants and recalls among the clients as well as predict and accelerate across protocols across those clients.

In a network configuration according to one embodiment of the present invention, a client/server transaction prediction and acceleration system is adapted to work with a direct access SAN file system. In the examples here, a client-side engine is coupled to one or more clients and a server-side engine is coupled to one or more servers and the engines coordinate with one another to perform transaction prediction and acceleration. Similar approaches are described in the patent applications and patents cited above. These are examples. It is possible for mixtures of clients and servers to exist at either end of the communication path and for the client-side device to perform server-side engine functions and vice versa, but for the purposes of explaining these examples, the clients and servers are situated at distinct ends of the communication path.

In this model, a client-side engine and a server-side engine are interposed in one or more transport connections of both the FSP client-server connection as well as the SAP session between the client and the storage target. Such interposition can be accomplished by terminating the transport connections either transparently or non-transparently using a number of different mechanisms, e.g., those described in Demmer I. "Terminating" connections refers to assigning them endpoints. For example, in a simple system without accelerators, a connection might be terminated at a client and at a server, i.e., packets in a session flow from the client to the server and back and packets and other traffic obeys the protocol requirements when traversing the connection from one terminal (the client or the server) to the other terminal. As explained in McCanne I and elsewhere, a connection that terminates at a client and terminates at a server can be transparently replaced with two, three or maybe more connections each having termination points somewhere along the path between client and server.

Instead of transparent connections, wherein a client and server believe they are at the terminals of the connection when in fact the connections terminate at the proxies, the initiator of a SAP transaction could be configured to establish its SAP connection explicitly with the client-side engine by using an IP address of the client-side engine as the destination for the connection, and the client-side engine could in turn establish a corresponding connection through the server-side engine to the target. Upon the client issuing a SEND-TARGETS SAP command, the client-side engine could forward the command to the target and modify the response from the target so that the IP addresses point to the client-side engine rather than the target. Many such variations are possible for effecting the arrangement where the TCP connections are terminated at the engines in this fashion. The particular commands used for SAP steps or FSP steps might also vary.

However the client-side and server-side engines get been interposed in the TCP connections that comprise a SAN file system client-server session, cross-session transaction acceleration and prediction can be performed. In order to do so, associations are established so that the engines are aware of which connections belong to which application-level sessions. In order to optimize SAP requests and responses that correspond to a particular FSP connection, the engines will infer (or find out some other way) that particular SAP I/O traffic is associated with a particular FSP connection and a particular set of FSP commands carried out over the FSP connection.

One method of inferring is for the engines to use volume label information that is present in the FSP layout messages as well as part of the SAP target references. Since FSP layout messages include a volume label as part of the layout data structure and since the engines can track which volumes are being accessed over a particular SAP connection by a particular initiator, the engine can infer which SAP traffic corresponds to a particular file system client's actions.

FIG. 1 illustrates one example network configuration. There, a client 100 is coupled to a client-side engine (CSE) 102 via a LAN switch 101. In turn, client-side engine 102 is coupled to a server-side engine (SSE) 105 via a WAN connection incident to WAN routers 103 and 104. Server-side engine 105 is further coupled to a file server 107 and a storage target 108 via a LAN switch 106. It is assumed in this example that storage target 108 is accessible over an IP network using SAP and file server 108 is accessible via FSP, but other variations may work in an analogous manner.

In this example, file server 107 manages a file system that is stored on one or more volumes of storage target 108. In a SAN file system configuration, client 100 mounts a particular file system using FSP over a TCP connection terminated at file server 107. In addition, client 100 mounts a raw disk volume via an SAP session established between client 100 and storage target 108. In general, there may be one or more TCP connections comprising the SAP session, e.g., to implement SAP multi-path I/O (MPIO), but for the simplicity of exposition, this example depicts the SAP session as comprising a single TCP connection at storage target 108. Also, there may be multiple clients and servers and storage targets, but for the purposes of exposition, a scenario is depicted using a single client, file server and storage target.

FIG. 1 further illustrates various connections that might be made in the ordinary course of operation. The connections are shown in the figure as dotted lines between a connection's termination points. The arrangement of TCP connections shown can be used in performing cross-protocol transaction acceleration and prediction.

In this example, the FSP connection and the SAP connection are terminated at the client-side and server-side engines. Specifically, an FSP TCP or similar connection 110 from client 100 is terminated at client-side engine 102 and an FSP TCP or similar connection 112 at server 107 is terminated at server-side engine 105. A third connection 111 interconnects client-side engine 102 with server-side engine 105, effecting an end-to-end transport path for the FSP connection between client 100 and server 107. Using these connections, messages can flow from client 100 over connection 110 to client-side engine 102, which in turn possibly forwards, observes, injects, filters and/or otherwise processes the message before sending it or other messages (or not) on to server-side engine 105 via connection 111. In turn, server-side engine 105 receives messages over connection 111 and possibly forwards, observes, injects, filters, and/or otherwise processes the message or messages before sending it or other messages (or not) to server 107 via connection 112. A similar process occurs for messages sent from server 107 over connection 112 back toward client 100.

In general, this arrangement whereby the client-side and server-side engines are interposed within the client-server connection allows the client-side and server-side engines to observe, inject, filter, and/or otherwise manipulate protocol messages as they flow between the client and server and vice versa. Like the FSP connection, an SAP (storage access protocol) TCP or similar connection 120 from client 100 is terminated at client-side engine 102 and an SAP connection 122 at storage array 108 is terminated at server-side engine 105. A third connection 121 interconnects client-side engine 102 with server-side engine 105 effecting an end-to-end transport path for the SAP connection between client 100 and storage array 108.

As described above, client-side engine 102 and server-side engine 105 might infer associations between the SAP session and the FSP session to perform optimizations.

For example, by observing protocol messages traversing the FSP and SAP connections, client-side engine 102 infers that the FSP session comprising connections 110 and 111 is associated with the SAP session comprising connections 120 and 121. Similarly, server-side engine 105 infers that the FSP session comprising connections 111 and 112 is associated with the SAP session comprising connections 121 and 122. Such inference can be made on an ongoing basis by analyzing protocol messages continuously, or it could be carried out in a demand-driven fashion whereby when the prediction logic within one or both of the engines determines that actions should be taken (e.g., upon receipt of a response from the file server of a client's layout request), the corresponding connection is determined by analyzing the protocol message being acted upon (e.g., the client layout response would typically include information that identifies the storage volume in question; in turn, the SAP connection from the client to that storage target can then be looked up in the various data structures that manage the connections within the engine). Where inference is not needed, the relationships between FSP traffic and SAP traffic can be determined using other than inference.

Figure 2:
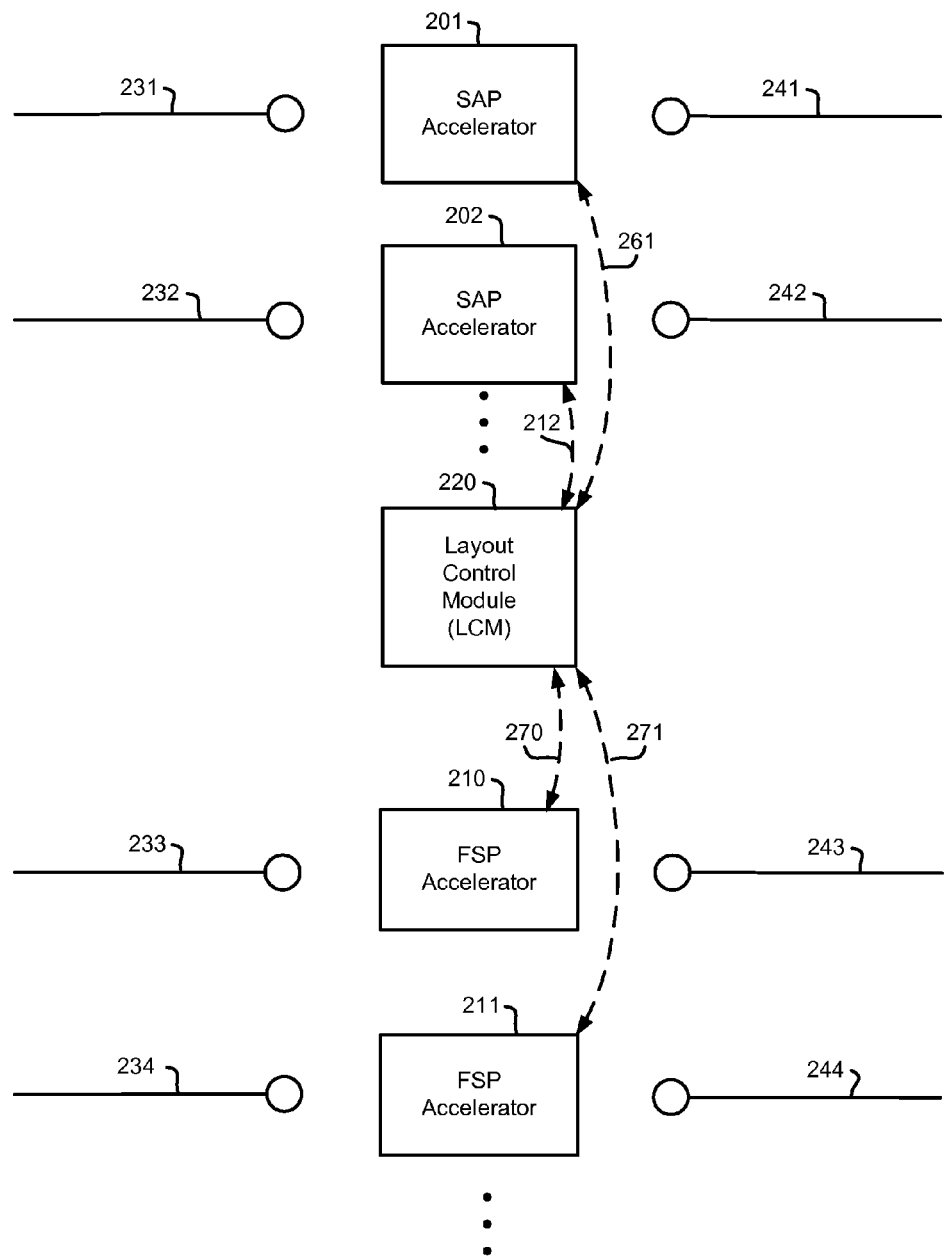
FIG. 2 is a block diagram illustrating the session connections made by various components of a client-side engine.

FIG. 2 shows a set of interacting modules for establishing the associations between one or more SAP connections and one or more corresponding FSP connections. All of the modules in the example depicted in FIG. 2 are situated within a client-side engine, but in some variations they are near the client-side engine. An example of such a client-side engine might be client-side engine 102. In some cases, client-side engine 102 and server-side engine 105 are symmetrically configured.

In this example, each FSP connection and each SAP connection originating from one or more clients is terminated at the client-side engine. For each first such connection, a second companion connection is established to a server-side engine, which in turn, establishes a third connection to the server as described earlier. Each pair of first and second connections within the client-side engine (or each pair of connections within the server-side engine) is referred to herein as a "splice". For example, the engine shown in FIG. 2 comprises SAP accelerator modules 201, 202, FSP accelerator modules 210, 211 and a layout control module (LCM) 220. As shown, SAP accelerator module 201 is spliced between a TCP or similar connection 231 and a TCP or similar connection 241. Similarly, SAP accelerator module 202 is spliced between connection 232 and connection 242. Continuing the example, FSP accelerator modules 210 and 211 are spliced by TCP connections 233/243 and 234/244, as indicated in the figure.

To perform protocol acceleration, the client-side (or server-side) engine can employ an acceleration module for each splice that performs various protocol optimizations, e.g., predicting transactions on behalf of clients or acknowledging transactions back to clients on behalf of servers, in order to enhance the performance of the protocol over a wide-area network, as in McCanne III. In this scenario, an SAP acceleration module is situated within each splice that carries an SAP connection. Likewise, an FSP acceleration module is situated within each splice that carries an FSP connection.

Because of the plurality of protocols used to effect a file service, the SAP acceleration module uses additional information from the corresponding FSP connection in order to perform optimizations over SAP, as described in more detail below. This information might be provided by having layout control module 220 track the FSP layout requests in the various FSP connections (over internal connections 270, 271 or otherwise) and maintain data structures that track the active layouts on behalf of each client. For each layout requested over the FSP connection with respect to a given SAP target, the corresponding SAP acceleration module is informed (over internal connections 212, 261 or otherwise).

These modules can be synchronized as needed to adhere to the protocol semantics so that the timing of protocol messages follows important ordering constraints. For example, if a client relinquishes a layout over its FSP connection, then the LCM invalidates any predicted transactions (or completes any pipelined writes) before the client's message is forwarded on to the FSP file server. As such, race conditions that would otherwise violate the semantics of SAP are avoided.

Figure 3:
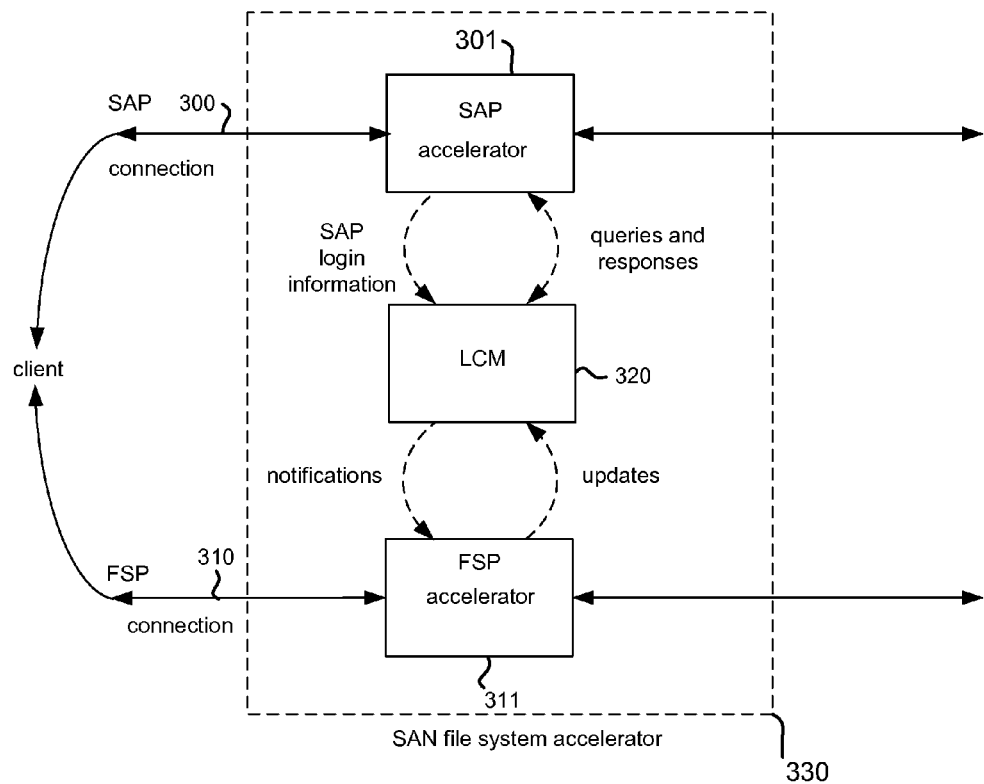
FIG. 3 a block diagram illustrating an example of elements of a SAN file system accelerator in which various protocol accelerators interact with layout control module.

FIG. 3 illustrates one embodiment of an SAN file system accelerator 330 in which the various protocol accelerators interact with the LCM. In this example, similar to the example of FIG. 2, an SAP accelerator 301 manages an SAP splice having an SAP connection 300, an FSP accelerator 311 manages an FSP splice having an FSP connection 310, and both modules communicate with an LCM 320. Taken together, the SAP connection 300, SAP accelerator module 301, FSP connection 310, FSP accelerator module 311, and LCM 320 can be viewed as a single SAN file-system accelerator module 330 that operates across multiple connections.

In this example, a single FSP connection and a single SAP connection are depicted, but in general there may be one or more SAP connections compromising a single SAP session. As various protocol events occur in the two connections, notifications flow between the modules. In particular, as the FSP acceleration module notices FSP layout operations occurring (requests, revocations, or returns), it notifies the LCM so that each layout and the state associated with each layout may be tracked. Included in this information is the client identification (e.g., its IP address) as well as the SAP device and volume identification information that is present in each layout operation. In this fashion, the LCM can know exactly which clients have which layouts, which volume and storage device the layout represents, and the precise state of each layout. In some variations, the LCM has less information.

As each layout operation is conveyed from the FSP acceleration module to the LCM, an update is in turn forwarded to the SAP acceleration module. By doing so, the SAP acceleration module becomes informed of what layouts have been granted to the client. Furthermore, if modifications are made to a file with corresponding layouts in the LCM through operations sent over the FSP connection, the LCM is notified of such changes, which in turns notifies the relevant SAP acceleration module. In this fashion, any predicted portions of the underlying extents can be updated or invalidated. Armed with this information, the SAP acceleration module can perform various protocol optimizations that enhance performance over a high-latency WAN path or other paths.

Consistency Model

In order to perform optimizing transformations on the underlying SAP protocol messages, the system accelerator should ensure that such transformations are safe, in the sense that they do not change the semantics of the protocol and they adhere to the data consistency model of the protocol. As described in Black et al., a pNFS controller and target typically implements a "one writer XOR multiple readers" data access model. This means that to obtain the desired data consistency model, either a single writer or multiple readers, exclusively, are allowed to operate at any given time. In other words, a writer requires exclusive access to the resource. Unless otherwise stated, the descriptions herein assume that the controller implements and enforces the "one writer XOR multiple readers" consistency model. For example, if a client issues a read-only layout request that overlaps with an existing outstanding read-only layout grant, then the request would be satisfied because multiple readers are permissible. However, if a client issues a layout request for a read-write extent that overlaps with an existing outstanding read-only or read-write layout grant, then the request would be denied because it would violate the data consistency model. A client might recover from a denied request like that by retrying its request at some future time expecting the server to attempt to reclaim the existing outstanding layout grant that had been responsible for the conflict.

Detailed Protocol Acceleration Example for SAN File System Block-Data Reads

Figure 4:
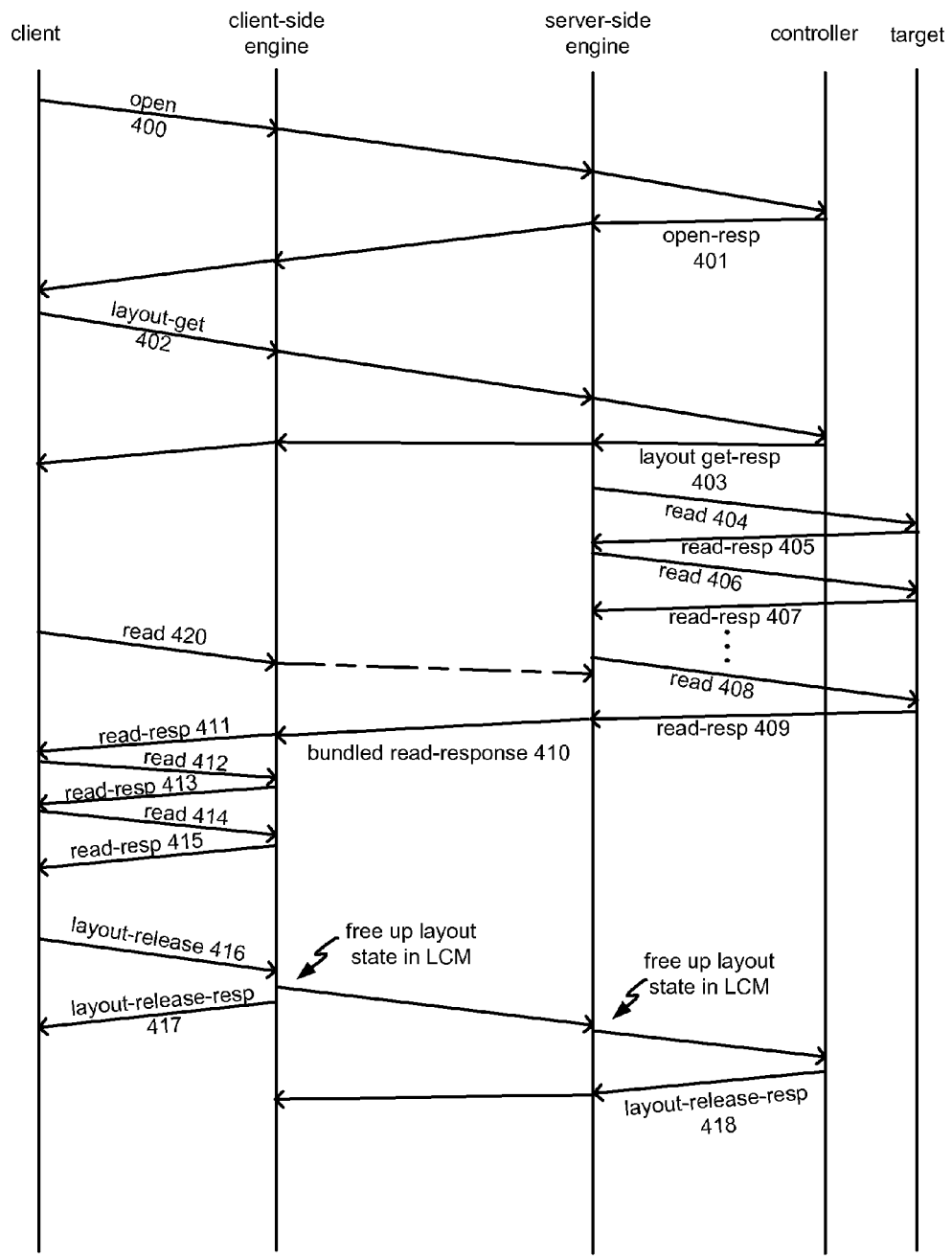
FIG. 4 is a time-space message diagram illustrating an example of a cross-protocol acceleration process.

FIG. 4 shows a time-space message diagram for an SAP read sequence. In this sequence, SAP reads may be optimized by SAP acceleration modules in a client-side engine and a server-side engine where block reads fall within a granted layout. In each of the time-space diagrams, distance is represented horizontally and time vertically, thus depicting the exchange of messages back and forth among the various system components. The vertical distance may not be to scale.

Throughout these examples, high-level terminology is used for the various FSP message types and the details of the specific operation code names, various header fields, and so forth are omitted for clarity of explanation. It is assumed that the client has established two transport connections, one to the controller called the "controller connection" (an FSP connection) and another to the target called the "target connection" (an SAP connection). Both of these connections are intercepted and processed by the client-side engine and server-side engine as described above.

By collecting up the proper state from observations of the controller session, block-data read requests from the client may be accelerated by predicting which blocks the client might request, and pre-issuing these requests as in McCanne III. It should also be noted that, as described herein elsewhere, the data to be sent can be segmented and some or all segment data replaced by segment references. In this example, the server-side engine uses a client's layout grant to create transactions that directly fetch blocks from the SAP storage device rather than through the controller as in a normal SAN file system. Initially, the client opens a file by sending an "open" message 400 to the server over the controller connection.

An open-response 401 is returned by the server and traverses the client-side and server-side engines, ultimately reaching the client. As the open-response flows through either engine, the FSP accelerator module notes the file handle of the newly opened file, which may track certain file server state such as open files to perform various predictive optimizations for FSP as in McCanne III. However, in this example, the description focuses on the predictive optimizations most useful to SAP and the SAP accelerator module in the client- and server-side engine. The engines might not explicitly track open file state or FSP file handles.

The server-side engine can optimize the sequence of read requests it issues to account for the side information that is conveyed by the granted layout requests. In addition, the server-side and client-side engines also track locking information and share reservations when and if they occur with respect to a particular file and related layouts. When and if this is the case, optimizations are made only when the locking semantics would permit such optimizations to occur and read and write responses are generated such that their actions and results confirm to locking state that has been established with respect to the FSP session.

Rather than blindly reading sequential blocks, the server-side engine can read the blocks that are indicated in the extent data structures within the granted layout. In addition, since the extents indicate whether valid data is present in each block, only the blocks with valid data need be read (i.e., blocks may be allocated but not yet written to by the file system and thus do not need to be read across the network)

Continuing the example, the client issues a layout-get request 402 over the control connection. This request flows through the client-side and server-side engines to the controller, which responds with a layout-get-response 403, indicating the extents on the storage target that correspond to the file in question. As the layout response flows back from the controller toward the client, the server-side and client-side engines take note of the response and store state in the LCM to track the granted layout. In this manner, the LCM stores protocol state data for one protocol that is used for accelerating another protocol.

At this point, the server-side engine can speculatively execute read-requests against the extent or extents present in the layout grant, in anticipation that the client will issue subsequent read requests against those extents. These reads can be issued safely as the controller has indicated to the client via the granted layout that the client has been granted safe access to the indicated blocks. At this point, the server-side engine issues read requests 404, 406, 408 over the target connection, and so forth, resulting in read responses 405, 407, 409, and so forth, from the server. The server-side engine can then bundle the read responses and optionally perform a data reduction transformation, e.g., using techniques described in McCanne I, McCanne II, and/or McCanne III. Such techniques can convert many reads and a large amount of data into a very thin envelope that travels across the WAN, which is in turn reconstituted to form the original data at the client-side engine. By issuing many predicted reads over a LAN in some small amount of time (typically sub-millisecond(s) per read) and bundling the results in this fashion, a very large amount of data can be transported over the WAN with a minimal bandwidth requirement in a single wide-area round-trip time.

Different policies and logical schemes may be used by the SAP acceleration module in the server-side engine in determining how and what reads to execute speculatively, e.g., as described in McCanne III. Reads that cover the entire layout may be pre-issued or some subset of the layout might be read according to other information about the file or the file's historical access patterns, e.g., if it is sequentially read, or if only certain parts of the file are frequently accessed.

The server-side engine may use feedback from the transfer rate of the first set of reads to throttle how subsequent reads are issued, e.g., similar to the write throttling mechanism described in Subbanna I. For example, when the client issues a read-request for block K, within a granted layout L, the acceleration module may predict that the client will issue reads for block K+1, K+2, . . . K+M for some M whereby all such blocks fall within the layout L. Past observed behaviors might be used to improve the predicted pattern of block reads. While the prediction sequence may be a sequential set of blocks such as block K+1, K+2, . . . , more complicated, non-sequential prediction may be derived based on past observations.

Once the predicted reads have been issued and transferred to the client-side engine, they are stored in a prediction buffer to be matched up against subsequent reads issued by the client. Continuing the example of FIG. 4, the client then issues read requests 420, 412, 414, and so forth, over the target connection. The first read 420 may stall while the predicted reads are being transported over the network.

In some embodiments, the client-side engine may know that the server-side engine has or will pre-issue read requests for the data in question and may simply stall the client's read until the data arrives. In other embodiments, the client-side engine may be uncertain as to whether the server-side engine is pre-issuing the read in question and may thus forward the client's read to the server-side engine. Once the server-side engine receives that read, it may drop it, if it has already answered the read in question with a predicted read, or otherwise, it will issue the read against the target.

When the client's read requests conform to reads that have been predicted and are stored in the client-side engine's prediction buffer, the client-side engine simply synthesizes a new read-response in response to the client's read. In this example, the client-side engine responds to the client's read requests 420, 412, 414, and so forth with read responses 411, 413, 415 and so forth.

Finally, once the client has finished reading and/or manipulating the extents represented by the layout grant, it releases the layout by issuing a layout-release request 416 over the controller connection (a layout release in draft specifications of pNFS is called a "layout-return message"). This message flows through the client-side and server-side engines to the controller. As the message flows through the client-side and server-side engines, the LCM in each engine is updated to reflect the fact that the layout has been released so that no optimizations are issued against those extents from that point on (or until a new layout is granted). In this way, the semantics of the SAP protocol are adhered to and no unsafe predictive operations are ever performed. A layout-release response message 418 completes the operation.

Since data blocks resulting from predicted requests are stored by the client engine in a prediction buffer with no awareness from the controller and data storage devices, the engine is responsible for noting when blocks become inconsistent with known file system state, and removing or reissuing the associated transactions. As part of this consistency checking, the engine may monitor subsequent block writes and layout returns by clients, controller layout recalls, controller size changed messages, and grant denials and either invalidate impacted predicted requests or modify the contents of the corresponding data buffer.

Figure 5:
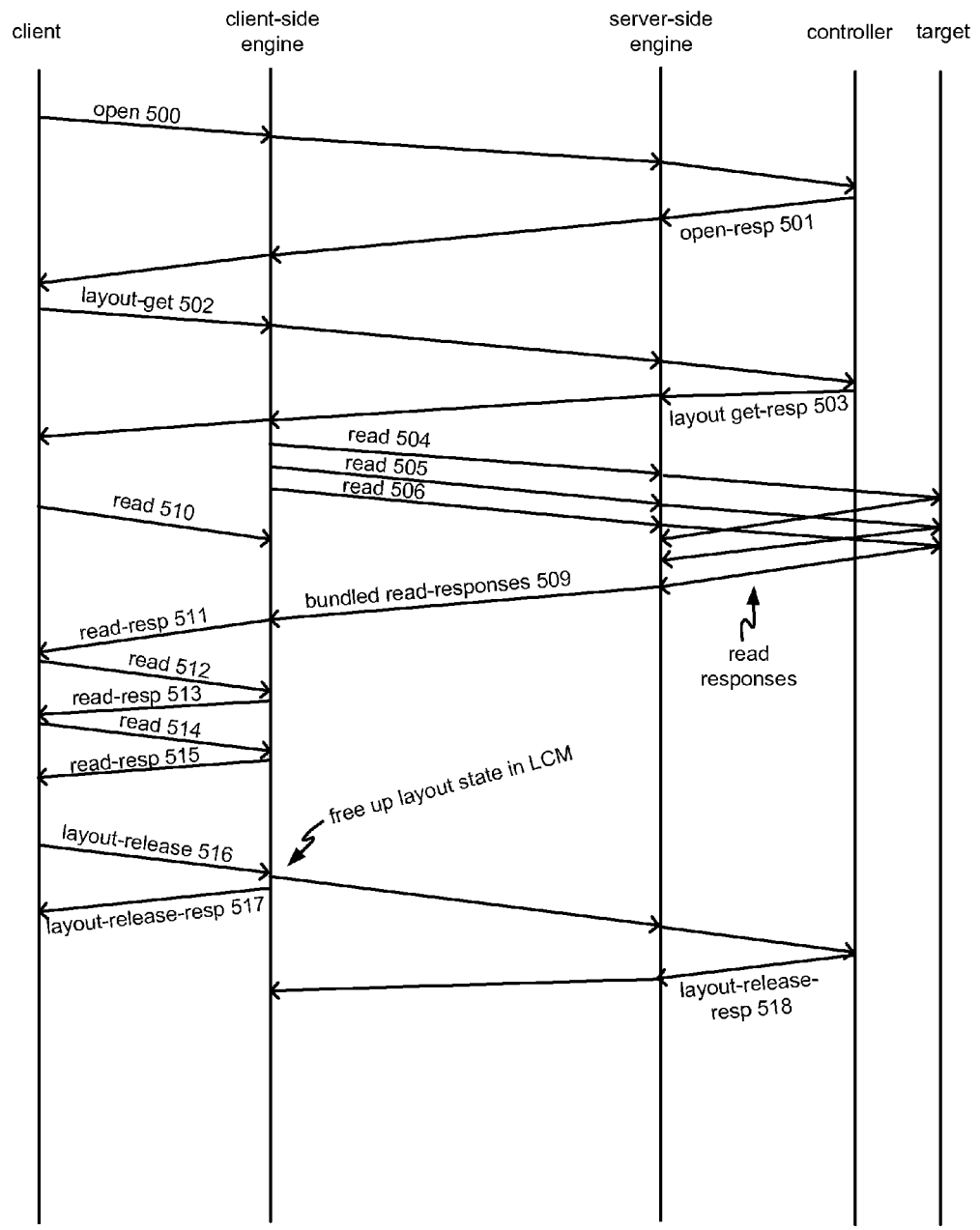
FIG. 5 shows a variation of the time-space message diagram of FIG. 4, for accelerating SAN file system reads over a network.

FIG. 5 shows a variation of the above described technique for accelerating SAN file system reads over a network. In this scenario, the logic is similar, but rather than having the server-side engine issue the predicted read requests and transporting those reads to the client-side engine, the client-side engine implements all such logic. As before, the client opens a file (open request 500), sees an open-response 501 and requests a layout (layout-get 502). Once the layout-get response reaches the client-side engine, the client-side engine stores the layout grant information in the LCM and instructs the SAP acceleration module to begin issuing predicted read requests (read 504, 505, 506).

As above, there are many different variations for how the client-side engine might issue such predicted requests, provided they all fall within the extents contained in the layout grant. Once the read-requests are answered by the target, they are optionally coalesced (bundled read responses 509) as described above. Upon reaching the client-side engine, they are stored in a prediction buffer.

At this point, the pending read request 510 from the client may be answered (read response 511), in turn, causing the client to issue the subsequent read request 512 and response 513, read request 514 and response 515, and so forth.

Eventually, the client issues a layout release 516, which might be responded to by the client-side engine preemptively sending a layout-release-response 517 and discarding the layout-release-response 518 received from the controller if all is as expected.

Detailed Protocol Acceleration Example for SAN File System Block-Data Writes

Just as with issuing read requests over a high latency path, issuing a sequence of write requests can likewise impact performance. One problem that occurs is that once a write for block K occurs, the client typically blocks until the write-response for block K is returned. At that point, the client sends the next write for block K+1, and so forth. While data written by a client cannot be predicted in the same fashion as read requests, it is certainly the case that write-acknowledgements can be predicted to be returned by the storage target in response to the client write messages and thus they too can be accelerated by inducing the client to send more than one write per round-trip.

By pre-acknowledging or "pre-acking" at the client-side engine each write-request before it ultimately reaches the server, the throughput of a sequence of write operations can be significantly accelerated. To this end, the client-side engine issues a write-response to a write-request as soon as it is received over the LAN, causing the next write to proceed in a LAN round-trip instead of a WAN round-trip. The client-side engine then takes responsibility for ensuring that the corresponding write is safely delivered to the storage target.

In general, such a scheme only works when it can be safely reasoned that the storage protocol semantics are preserved under such a sequence of events. While this can be attained for certain file access protocols, it cannot be safely applied to SAP in general. However, armed with the layout information provided by the FSP connection and contained in the LCM, such transformations are possible. As long as a write-enabled layout has been granted to the client, it is safe for the client-side engine to pre-ack each write that falls within a granted layout up until the point that the client issues a FSP layout-commit request. When a layout-commit is encountered, the client-side engine must ensure that all pending writes as well as the subsequent layout-commit have been forwarded to the target and acknowledged by the target before allowing the layout-commit response to be successfully returned to the client.

In particular, consider a sequence of writes to a particular extent that are pipelined as described above. Further suppose the client commits the corresponding layout after those writes are complete. At this point, the client-side engine can hold up the layout-commit, by not forwarding the message on to the controller, while it safely transmits any pending writes from the client-side engine buffers to the storage target. Once all the writes have been acknowledged, then the client-side engine forwards the client's layout-commit to the controller over the FSP connection. After the controller acknowledges the commit, the original client's layout commit operation is acknowledged knowing that the writes are all safely committed on the storage target and the layout is committed on the controller.

Alternatively, a round-trip delay can be avoided by having the server-side engine hold on to the layout-commit until the target has acknowledged all of the writes. In this fashion, the layout-commit can be forwarded as soon as the last write is acknowledged over the LAN, rather than after the last write-acknowledgement reaches the client-side engine, thus avoiding a round-trip time of unnecessary delay.

Figure 6:
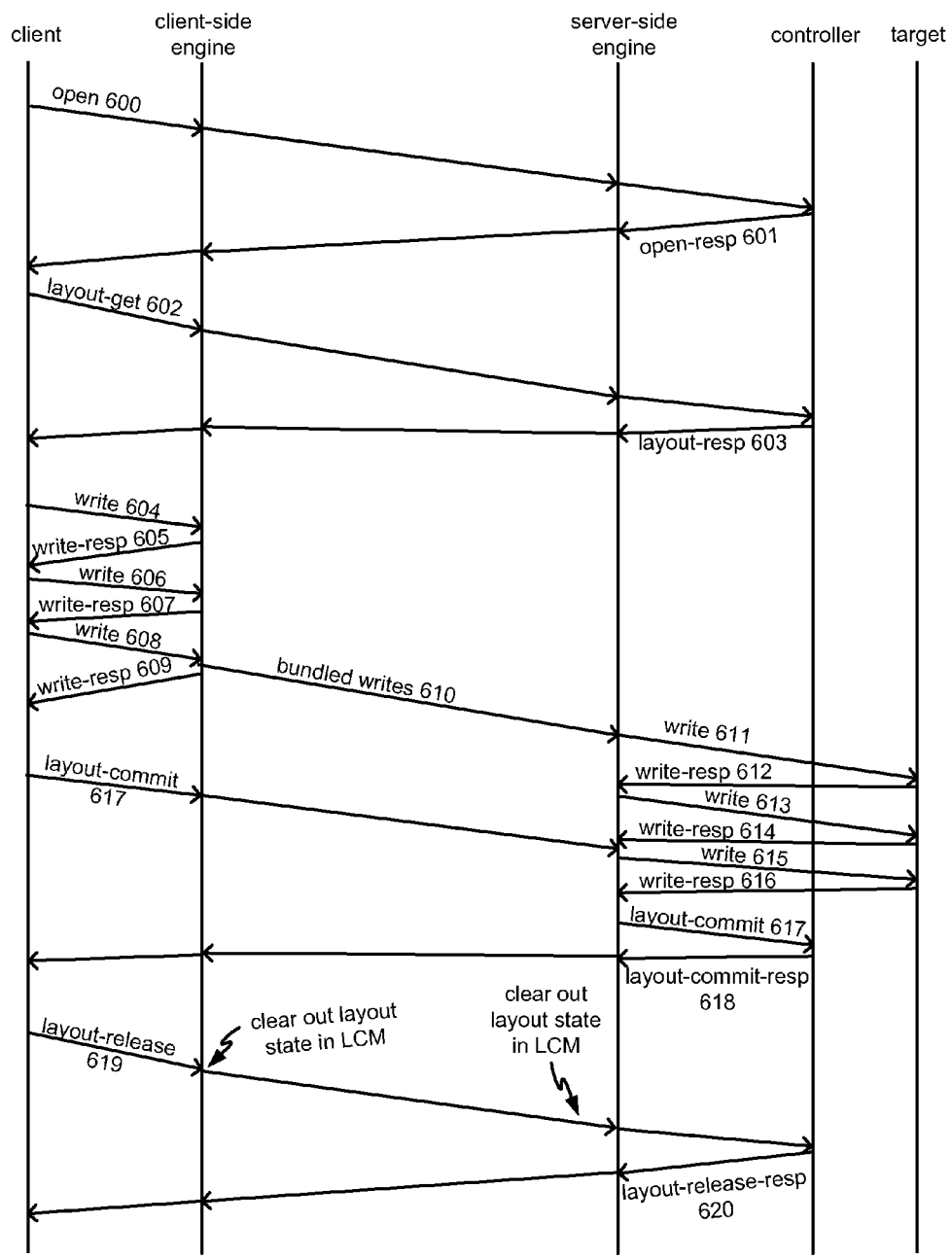
FIG. 6 shows a time-space message diagram where storage assess protocol writes are optimized.

FIG. 6 shows a time-space message diagram of a sequence including a sequence of SAP writes optimized by SAP acceleration modules in a client-side engine and a server-side engine where block writes fall within a granted layout. By collecting up the proper state from observations of the controller session, SAP block-data write requests from the client may be accelerated by predicting that the server will acknowledged the writes, and pre-issuing these write acknowledgements. If this write acknowledgement is mis-predicted, e.g., because the write fails, then such a failure can be conveyed in the failure of the layout-commit message, as described below.

In this example, the client-side engine uses a client's layout grant to create transactions that pre-acknowledge SAP write requests. Initially, the client opens a file by sending an "open" message 600 to the server over the controller connection. The open-response 601 is returned by the server and traverses the client-side and server-side engines ultimately reaching the client. As the response flows through both engines, each FSP accelerator module notes the file handle of the newly opened file, which may track certain file server state like open files to perform various predictive optimizations for FSP. However, in this example, the predictive optimizations are for SAP connections only and the SAP accelerator modules in the client- and server-side engines do not need to explicitly track open file state or FSP file handles.

Continuing the example, the client issues a layout-get request 602 over the controller connection. This request flows through the client-side and server-side engines to the controller, which responds with a layout-get-response 603, indicating the extents on the storage target that correspond to the file in question. As layout-get response 603 flows back from the controller toward the client, the server-side and client-side engines take note of the response and store state in their respective LCMs to track the granted layout. Next, the client issues a write-request 604 over the target connection. At this point, the client stalls and waits for a response to the write request. As such, the client-side engine pre-acks the write by sending write response 605, triggering the next write request 606, and the next response/request 606/607 and 608/609, and so forth. These writes can be safely acknowledged in this fashion because the FSP protocol does not require that such writes be flushed to stable storage until a FSP layout-commit operation is sent over the controller connection.

The client-side engine can then bundle the write requests (bundle 610) and optionally perform a data reduction transformation, e.g., using techniques described in McCanne I, McCanne II, and/or McCanne III. Such techniques can convert many writes and a large amount of data into a very thin envelope that travels across the WAN, which is in turn, reconstituted to form the original data at the server-side engine. By issuing many optimized write requests over a LAN in some small amount of time (typically sub-millisecond(s) each) and bundling the results in this fashion, a very large amount of data can be transported over the WAN with a minimal bandwidth requirement in a single wide-area round-trip time.

Once the optimized writes have been issued and transferred to the server-side engine, they are forwarded on the storage target. Continuing the example of FIG. 6, the server-side engine issues write requests 611, 613, 615, gets write responses 612, 614, 616, and so forth. While this is occurring, the client commits the writes by sending a layout-commit 617 message over the controller connection. The layout-commit is forwarded on to the server-side engine, which in turn holds the message until all the pending writes have completed over the target connection. At that point, the server-side engine forwards the layout-commit message over the controller connection and relays the response 618 back to the client via the client-side engine.

Finally, once the client has finished writing to and/or reading from the extents represented by the layout grant, it releases the layout by issuing a layout-release request 619. This message flows through the client-side and server-side engines to the controller. As the message flows through the client-side and server-side engines, the LCM in each engine is updated to reflect the fact that the layout has been released so that no optimizations may be issued against those extents from that point on (or until a new layout is granted). In this way, the semantics of the SAP protocol as used by FSP are adhered to and no unsafe predictive operations are ever performed. The controller then response with a layout-release response message 620.

Now, supposing in the example of FIG. 6 one of the writes 611, 613, or 615 failed for some reason. The server-side engine would note of the failure by recording state in the LCM as to the nature of the error. Then, when the server-side engine received the layout-commit message 617, it would similarly respond with a layout-commit response 618 but indicate an error in its message. In this way, the client is informed that one or more of the writes that had been previously issued did not complete as requested, and again, the semantics for SAP as used by FSP are preserved.

Transaction Prediction for Layout Requests

In addition to pre-fetching block data referenced by a layout, layout requests themselves can be predicted and thus pre-fetched. As a client reads its way through a file, the client will typically request layouts for subsequent file extents in a serialized fashion or other access pattern. This access pattern can be recognized, and the client engine may request subsequent layouts ahead of the client's actual request for them. The engine would store the layout grant and return it immediately to the client when the request is issued. Should the predicted request not be made by the client within some configurable window of time, the engine may relinquish the grant back to the controller, or it may instead retain the grant until it is explicitly recalled by the controller.

When a client engine is connected to multiple clients, it can use information about the file system access state of a client to help predict transactions for another. As an example, by monitoring client layout requests and grants, the client engine can detect one client's request for a layout extent that overlaps with one already held by another client, and possibly accelerate layout-related transactions that will follow.

Overlapping requests may be either conflicting or non-conflicting. A conflicting layout request could be, for example, a request for exclusive write access to an extent that has outstanding read-only grants, or a request for read access to an extent having an outstanding read-write grant. A non-conflicting layout request could be, for example, one for shared read access to an extent covered by another client's read grant. Layout-related messages from the controller that can be safely accelerated include recalls of extent grants and grant denials (because the current holders can always re-request the extent), and read grants for extents already covered by another client's read grant (because no additional server-side capabilities are required, and the accelerated grant can be replaced by the subsequent actual grant—or denial—when it arrives).

Example: Accelerating a Conflicting Layout Request

In the case of FSP protocols, such as pNFS or MPFS, a conflicting layout request will generally cause the controller to reject the request with a "try again later" message. The controller will then issue a recall message for the grant to the client holding it. Once it has received a layout return acknowledgement from that client (or after the grant lease expires), the controller is able to issue a new grant when such a request is re-submitted.

The client engine could accelerate a grant request that overlaps the conflicting grant of another client by predicting and issuing the controller's recall message to the grant holder if the grant holder and the requester share a client engine. This would trigger a layout return message from grant holder. Although the layout return was the result of the predicted recall message rather than an actual recall from the controller, the return can be processed by the controller on receipt without having issued an actual recall. This forestalls the need for a recall to be issued later.

Further, the client engine could delay forwarding the client's request for the new grant until the existing grant holder has responded to the predicted recall message and issued a layout return. This would increase the likelihood that the grant request could be fulfilled by the controller on receipt.

Example: Accelerating a Non-Conflicting Layout Request

In pNFS, a non-conflicting layout request, such as one for shared read access, will generally result in the controller issuing a grant for the requested extent. The client-side engine could accelerate a grant request for a range that is contained within the grant of another client, or within the union of other clients' grants, by predicting a successful grant message based on the existing grant or grants. This relies on layouts being sharable among clients, and the clients involved having compatible access privileges.

Until the controller response to a grant request has arrived at the client engine, the validity of a predicted grant relies on the validity of the other clients' existing grants. During this window, should the client engine detect any layout returns for the original grants that would invalidate the predicted grant, it must recall the predicted grant. The client will respond with a layout return (which should be discarded by the client engine). It is expected the client will re-issue its layout request, which would then be forwarded without acceleration because no pre-existing grant covers it. Alternatively, if the original grant request/response is still in flight when the request is re-issued, the new request need not be forwarded to the controller, and the controller's eventual response to the original request can be used as the predicted response to this request.

When the controller response to the grant request arrives at the client engine, and it is verified to be a successful grant that is a superset of the predicted grant (it might differ in its overlap), the response can be discarded and the client can safely continue using the predicted grant. The protocol is explicitly robust to mismatches between the client state and controller's view of that state, provided the client's capabilities are a subset of those the controller thinks it holds. Alternatively, if the received layout differs in some substantial way from the predicted one, the predicted one can be recalled by the client engine as above, causing the client to re-issue its grant request. The controller's response to the earlier grant request, now at the client engine, can be returned as the predicted response to this request (assuming its extent is compatible with the re-issued request), in which case the re-issued request can be discarded rather than being forwarded to the controller.

Shared Layout Control Module

In another variation, associated with each layout is a sparse data structure containing the actual data (or a partial subset thereof) that underlies the extents of each granted layout held by the engine. Rather than hold predicted requests in a prediction buffer on a per-client basis, the data is stored, when present, in the data structure that represents the layout for as long as the layout is granted. This data structure may hold none, some, or all of the corresponding data. In this way, the extent data in various layouts may be shared across different client sessions. As such, the module managing the related data structures for achieving this end is called herein a Shared Layout Control Module (SLCM).

Unlike an application-oriented network cache, such as a Web cache, file cache, DNS cache, etc., that maintains replicas of application-level objects in a remote store and uses consistency mechanisms to try to keep the replica up to date with the original copy, an SLCM is a temporary repository for the official copy of the low-level data underlying the extents for a layout. As far as the SLCM is concerned, there need be no notion of an application-level object like a file and there need not be any mechanism for tracking the relationship between open files and the underlying data that is stored in the SLCM. Instead, the SLCM tracks the relationship between extents within granted layouts and the underlying data.

In this approach, if the original storage target receives a layout request or an I/O request for data that corresponds to an already delegated layout, it will deny the request and attempt to revoke the layout from its current location in anticipation of the client re-issuing the layout request. Instead of attempting to synchronize replicated objects with master objects, as a cache does, the SLCM simply fetches the data that underlies the extents of the layout each time a client accesses a particular layout. This can be made efficient by using WAN optimization techniques that transmit references to a protocol independent-data store, called a persistent segment store, so that each time the data is fetched only a small envelope of references need be transmitted across the network. Otherwise, in a protocol like iSCSI, for example, there is no way keep the data synchronized between a copy and the target short of re-reading the data each time a layout delegation occurs. Said another way, iSCSI has no native support for caching so each time a client attempts to access data blocks on an iSCSI storage server, those blocks must be newly read. For example, a file cache typically attempts to infer that the master copy of a file is synchronized with a cached copy by comparing the modification time of the file on the file server to the modification time of the file in the file cache. There is no way to perform a consistency check like this in the context of raw volumes, since protocols like iSCSI do not include mechanisms for tracking the modification times of each block.

With an SLCM managing the extents of all the layouts, layout requests from multiple clients can be effectively shared and managed within the client-side engine. Under this scheme, when the client-side engine receives a layout request from a client on the corresponding controller connection, it inspects the SLCM to see if a granted layout already exists locally. If so, and if the status of layout is consistent with the pending request, the layout is granted to the client in question and the SLCM is updated to reflect the fact that the client has an active grant corresponding to that layout. Each client that has successfully received such a layout request is said to be "active" with respect to that layout. To ensure that data accesses and modifications are properly synchronized across clients, only one client is allowed to have writeable access to a layout at any given time. This can be enforced using existing protocol messages in FSP to reclaim a layout and cause the impacted client to re-request the reclaimed layout.

If the client-side engine receives a layout request that is present in the SLCM but whose status is not compatible with the request, then the SLCM attempts to promote the status of the request. For example, if the layout is a read-only layout but the client is requesting read-write access, then the SLCM sends commands to the controller requesting a read-write layout. To do so, the controller may need to release the read-only layout before granting the read-write layout, which in turn may cause the SLCM to revoke the layout from each active client. Once the read-write layout has been established, the affected clients can re-request that layout and normal operation resumes as a client would normally do under the FSP model.

To achieve data consistency, the SLCM tracks the status of each block in each extent. Based on the layout grant, an extent (and thus all the blocks in that extent) is classified as read-only, read/write, invalid, or none. As defined in the pNFS specification, a particular FSP, a read-only block may only be read by the client; a read/write block has valid data and may be read or written by the client; an invalid block is allocated and may be written by the client to cause it to become read/write; and a "none" block has not been allocated and may not be read or written.

In addition to this defined state, the SLCM tracks the status of each block as to whether it is clean, dirty, or missing. A "clean" block is a block present in the SLCM that has the same contents as the corresponding block on the target. A "dirty" block is a block present in the SLCM that has contents that differ from the corresponding block on the target; a dirty block must be updated before other clients or the controller are allowed to access that block, i.e., before a layout-commit message for the layout containing that block is allowed to complete. Finally, a "missing" block is a block where the data is not present in the SLCM because it has not yet been fetched from the target.

In addition, when this approach is combined with the persistent segment store described above, the block data underlying the extents can be efficiently and compactly stored by maintaining references to the segment store data rather than managing a separate copy of the data.

Figure 7:
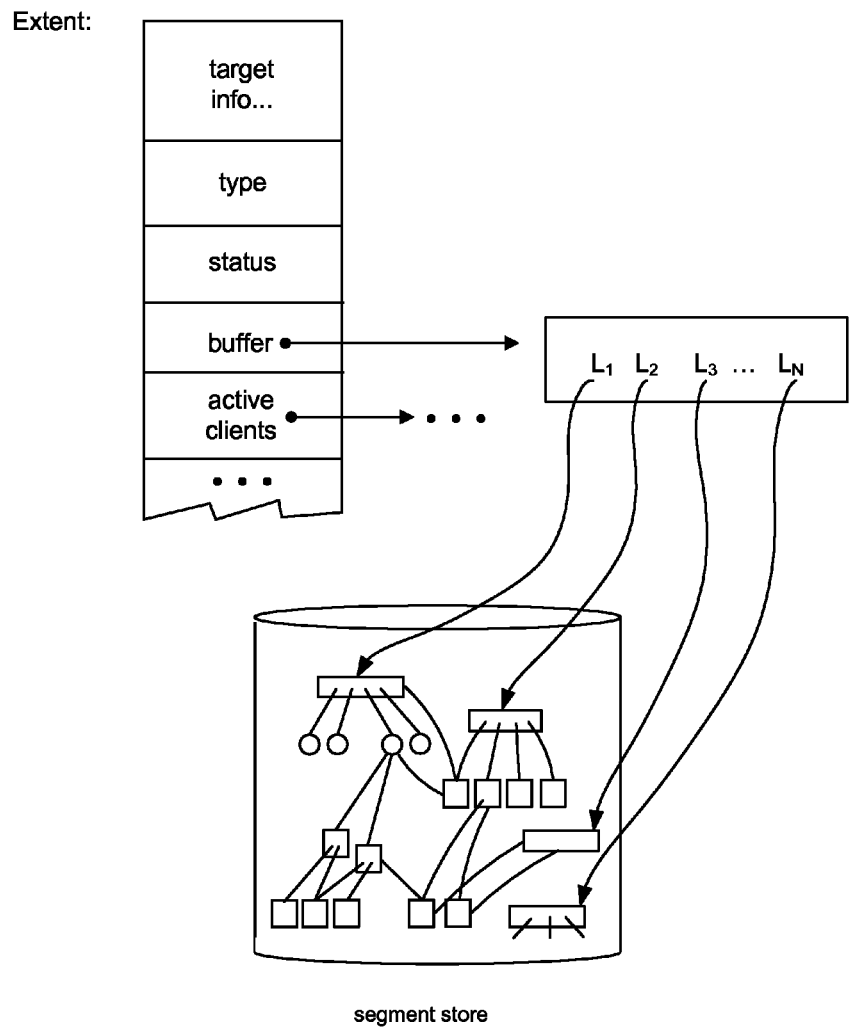
FIG. 7 illustrates a set of data structures that could, in part, be used to represent an extent and its underlying data.

FIG. 7 depicts this, showing an example of a set of data structures that could, in part, be used to represent an extent and its underlying data. Various pieces of information describing the target would be included (e.g., target name, LUN identifier, offset into physical volume, length of extent, and so forth), along with a type (read-only, read/write, etc. as described below), a status (clean, dirty, or missing as described above), a buffer pointer representing the data, and a list of clients that are active with respect to the extent in question. More specifically, the buffer may be represented by a list of segment labels that point into a segment store, or a persistent segment store, as described in McCanne I and McCanne II. Such a segment store is generally shared across other functions that are implemented by the client, for example, protocol acceleration of the data that flows over the FSP connection (in addition to the SAP connection) as well as other protocols like CIFS, MAPI, HTTP, WebDAV, and so forth as described in McCanne I and elsewhere. The segment store might also be shared across splices.

With an SLCM in place, layout requests from clients can often be locally handled in the client-side engine. Upon receiving a layout request from a client, if a compatible layout already exists in the SLCM, then the client-side engine creates a corresponding layout response, returns it to the client, and updates the state stored in the SLCM to reflect the newly active client. It does this without having to traverse the wide-area network to contact the controller thereby enhancing performance. If there is no such layout, then request is simply sent along to the controller and the SLCM is updated when the response arrives.

For example, suppose client 1 has a grant for some read-only layout L1. Further suppose client 2 requests a read-only layout L2 that overlaps with layout L1 such that L2 is entirely contained within L1. In the case of a read-only layout request, the client-side engine can then grant the L2 layout to client 2 by re-using the extents from the L1 layout grant. In doing so, the client-side agent tracks each outstanding locally generated layout grant and releases the original layout with the storage target only when the last client has released the corresponding layout.

Note that the L1 layout can be either a read-only or a read-write layout request. In the case that L1 is a read-write layout request, any changes written to the corresponding extents are stored in the SLCM, thereby causing any subsequent reads from either client to return the most recently written data in conformance with the semantics of the SAP protocol. Since the client-side engine can ensure that a sequence of I/Os is performed atomically against the data in the SLCM, in particular with respect to layout-commit requests, and since it can ensure that there is only ever at most one writer, data consistency is guaranteed. More generally, this model allows there to be an arbitrary number of clients sharing read-only layouts that overlap with at most one read-write layout.

If client 1 releases layout L1 before client 2 releases layout L2, then the client-side engine revokes layout L2 from client 2, ensures all pending write-requests have been committed to the storage target (if client 1 had a read-write layout), releases layout L1 by forwarding the release command to the controller, then acknowledges client 1's layout release command when the release acknowledgement is received from the controller. At this point, client 2 can re-request layout 2 and normal processing can resume.

If client 1 had requested a read-only layout while client 2 requests a read-write layout for the same overlapping extents, then a problem arises because reads and writes may be interleaved but the results nondeterministic if the target has no support for atomically executing I/Os. This situation can be handled by having the client-side engine deny the read-write layout request and simultaneously attempt to reclaim the read-only layout grant to client 1, as the target would normally do as described in Black et al. Here, client 2 would reattempt its read-write layout request after some timeout period, and successfully obtain the layout once client 1 has returned it to the client-side engine. Once the read-write layout has been granted, the response is forwarded on to the client and the SLCM in the client-side engine is updated to allow write modifications to that layout on behalf of client 2. Alternatively, rather than deny the client 2 layout request outright, the client-side engine can act as an intermediary that holds onto the client 2 layout request while it reclaims the client 1 read-only layout.

Figure 8:
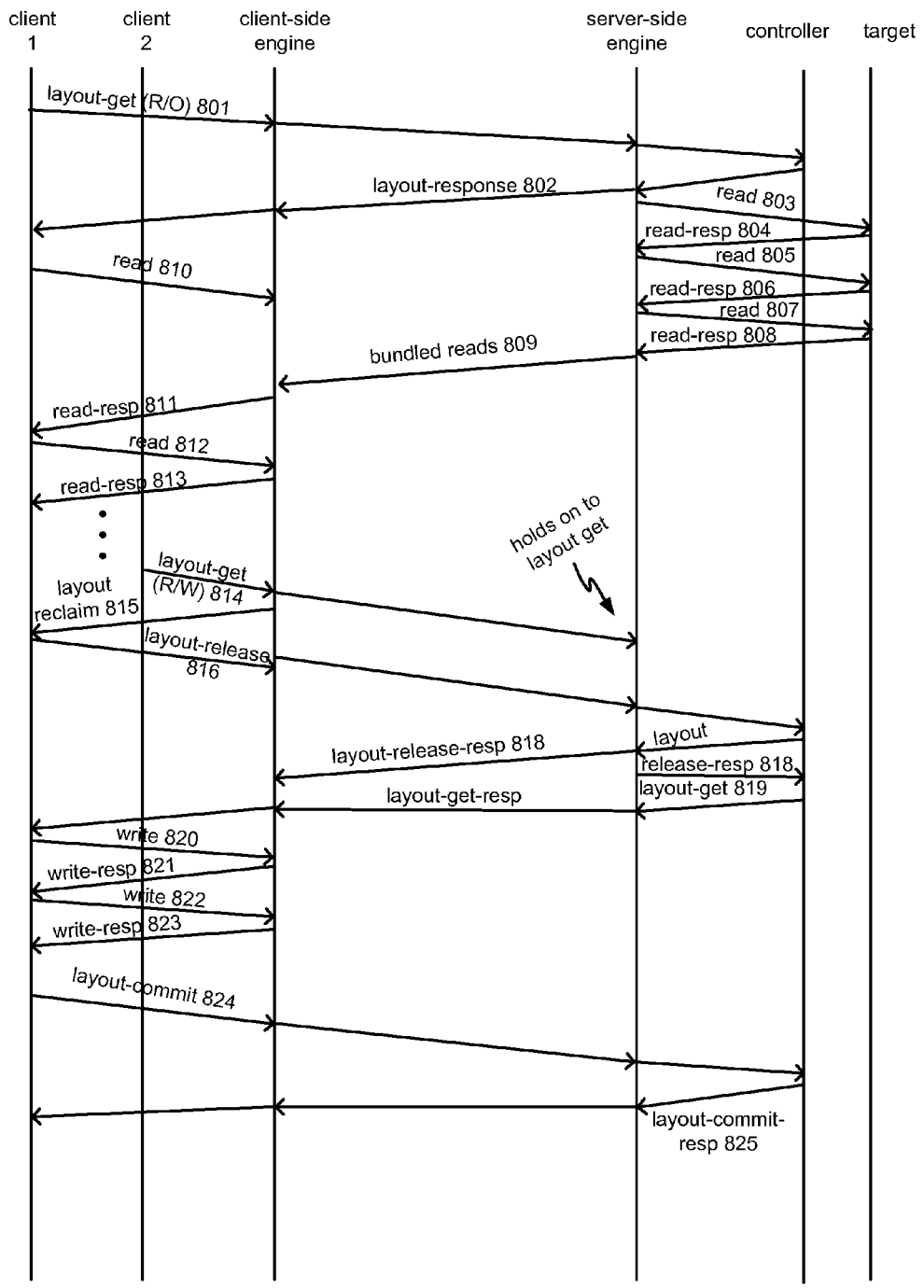
FIG. 8 shows a time-space message diagram where two clients interact with a client-side engine whereby the clients' layouts overlap and one layout is read-only while the other is read-write.

FIG. 8 shows a message diagram depicting this approach where two clients interact with the client-side engine whereby the clients' layouts overlap and one layout is read-only while the other is read-write. In this scenario, it is assumed that both client 1 and client 2 have already opened the file in question. Given this, client 1 requests a read-only layout 801 by sending the request message over the controller connection. As in earlier examples, a layout-response 802 is returned and the server-side engine speculatively reads the blocks that correspond to this layout by issuing read requests 803, 805, 807 and so forth over the target connection (getting responses 804, 806, 808 and so forth).

These reads are bundled, optionally using WAN optimization techniques as described earlier, and transmitted to the client side engine 809. At this point, client 1 performs reads 810, 812, and so forth of the data comprising the file, which are satisfied with read response 811, 813, and so forth from the client-side engine. At some later point, client 2 issues read-write layout-get request 814, but this cannot be satisfied because it creates a conflict, as described earlier, with respect to the "multiple readers XOR single writer" consistency model. Thus, the client-side engine forwards client 2's layout request on to the controller and simultaneously issues a layout reclaim message 815 in an attempt to retrieve client 1's conflicting layout.

When layout-get message 814 reaches the server-side engine, it is held until client 1's layout is released. Toward this end, in response to the layout reclaim message (815), client 1 releases the layout by transmitting layout release message 816, which is in turn forwarded to the controller. In turn, the controller responds to with a layout release message 818. At that time, the server-side engine transmits the deferred layout-request message on behalf of client 2 and the controller responds with layout-get response message 814, which is delivered back to client 2. At this point, the ownership of the layout in question has been successfully transferred from client 1 to client 2. Messages 819, 820, 821, 822, 823, 824 and 825 are used as shown.

Figure 9:
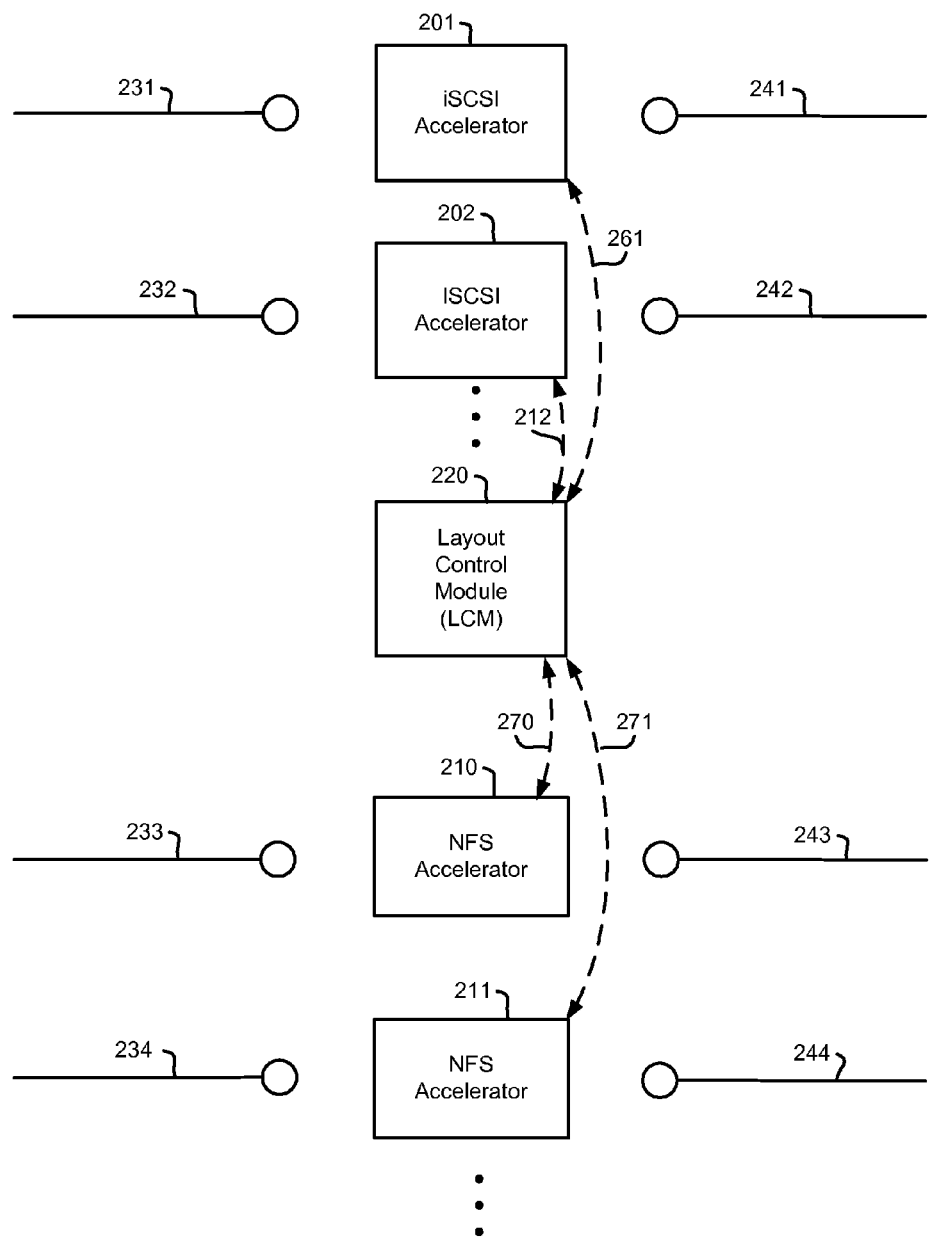
FIG. 9 is a block diagram illustrating the session connections made by various components of a client-side engine that comprises multiple instantiations of pNFS accelerators and multiple instantiations of iSCSI accelerators.

FIG. 9 is a block diagram illustrating the session connections made by various components of a client-side engine that comprises multiple instantiations of pNFS accelerators and multiple instantiations of iSCSI accelerators. This is similar to that shown in FIG. 2, but with a specific FSP and SAP used.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for protocol acceleration between a client device and a server device over a network, comprising:
   instantiating a first transport connection to a controller for a first application protocol between a client-side proxy and a server-side proxy, wherein the client-side proxy is in communication with the client device and the server-side proxy is in communication with the server device;
   instantiating a second transport connection to a target for a second application protocol between the client-side proxy and the server-side proxy;
   observing message payloads flowing between the client device and the server device over the first transport connection to the controller, the message payloads causing first application protocol events;
   generating and updating a layout granted to the client device based on the first application protocol events, wherein the layout describes a mapping between a file and the file's underlying representation on disk;
   deriving a protocol state from the observed message payloads indicating information about the layout granted to the client device for the first application protocol, wherein the protocol state includes one or more extents associated with the layout;
   storing, for the client-side proxy, protocol state data for the first transport connection to the controller;
   using the stored protocol state data indicating information about the layout granted to the client device for the first application protocol to predictively accelerate at least one message payload exchange based on the one or more extents associated with the layout using the second application protocol over the second transport connection to the target determining if any message payloads in the first protocol invalidate predicted transactions or messages; and
   if it is determined that a message payload in the first protocol invalidates a predicted transaction or message, unwinding the predicted transaction or message.

2. The method of claim 1, further comprising using the stored protocol state data for acceleration over a transport connection between one or more client device and one or more server device other than the client and server of the transaction from which the stored protocol state data was obtained.

3. The method of claim 1, wherein the first application protocol is a file system protocol.

4. The method of claim 3, wherein the file system protocol is NFS with pNFS extensions.

5. The method of claim 1, wherein the second application protocol is a file system protocol.

6. The method of claim 1, wherein the second application protocol is a storage access protocol.

7. The method of claim 6, wherein the storage access protocol is iSCSI.

8. The method of claim 1, wherein using the stored protocol state data comprises accelerating a first grant request from a requesting client that overlaps a conflicting grant of a grant holder client by predicting and issuing a recall message to the grant holder client if the grant holder client and the requesting client share a client-side proxy.

9. The method of claim 8, wherein using the stored protocol state data further comprises delaying the forwarding of the first grant request until the existing grant holder client has responded to the predicted recall message and issued a layout return message.

10. The method of claim 1, wherein using the stored protocol state data comprises accelerating a first grant request for a range that is contained within the union of grants to one or more client, by predicting a successful grant message based on existing a grant or grants.

11. The method of claim 1, wherein unwinding comprises discarding data obtained during the predicted transaction.

12. The method of claim 1, wherein unwinding comprises recalling a predicted grant.

13. The method of claim 1, wherein the stored protocol state data is used in providing a plurality of shared read-only layouts to clients that overlap with a read-write layout.

14. An accelerator for use in accelerating transactions over a network using a processor and memory, the accelerator comprising:
   a first accelerator for a first protocol, wherein the first accelerator is adapted to modify traffic through the accelerator that uses the first protocol in order to accelerate that traffic, acceleration being one or more of latency reduction, bandwidth usage reduction or reliability improvement, and wherein the processor is configured to instantiate transport connections to a controller between the accelerator and another network device that accepts transport connections using the first protocol;
   a second accelerator for a second protocol, wherein the second accelerator is adapted to modify traffic through the accelerator that uses the second protocol in order to accelerate that traffic, acceleration being one or more of latency reduction, bandwidth usage reduction or reliability improvement and wherein the processor is configured to instantiate transport connections to a target between the accelerator and another network device that accepts transport connections using the second protocol;
   a control module configured to:
      a) observe message payloads to the controller received by the accelerator over the first protocol, the message payloads causing first application protocol events;
      b) generate and update a layout granted to a client device based on the first application protocol events, wherein the layout describes a mapping between a file and the file's underlying representation on disk; and
      c) derive a protocol state from the observed message payloads indicating information about the layout granted to the client device for the first application protocol, wherein the protocol state includes one or more extents associated with the layout; and
   storage for protocol state data representing state changes inferred from the observed message payloads to the controller wherein the processor is configured to
      a) signal to the second accelerator protocol state data indicating information about the layout granted to the client device for the first application protocol to predictively accelerate at least one message payload exchange based on the one or more extents associated with the layout to the target done by the second accelerator using the second application protocol that requires at least some of the signaled protocol state data;

b) determining if any message payloads in the first protocol invalidate predicted transactions or messages; and c) if it is determined that a message payload in the first protocol invalidates a predicted transaction or message, unwinding the predicted transaction or message.

15. The accelerator of claim 14, wherein the control module is a layout control module that tracks layouts assigned to clients, wherein the first protocol is a file server protocol that includes requests for layouts, and wherein the second protocol is a storage access protocol.

16. The accelerator of claim 14, wherein the control module is a control module that also observes message payloads sent by the accelerator over the first protocol.

17. The accelerator of claim 14, comprising a plurality of first accelerators for a first protocol and a plurality of second accelerators for a second protocol.

18. The accelerator of claim 14, wherein the control module is configured to handle transactions with a plurality of clients and a plurality of servers.

19. The accelerator of claim 14, wherein the storage for protocol state data is configured to store data used in providing a plurality of shared read-only layouts to clients that overlap with a read-write layout.

20. A method for protocol acceleration between a client device and a server device over a network, comprising:

instantiating a first transport connection for a first application protocol between a client-side proxy and a server-side proxy, wherein the client-side proxy is in communication with the client device and the server-side proxy is in communication with the server device;

instantiating a second transport connection for a second application protocol between the client-side proxy and the server-side proxy;

observing message payloads flowing between the client device and the server device over the first transport connection, the message payloads causing first application protocol events;

generating and updating a layout granted to the client device based on the first application protocol events, wherein the layout describes a mapping between a file and the file's underlying representation on disk;

deriving a protocol state from the observed message payloads indicating information about the layout granted to the client device for the first application protocol, wherein the protocol state includes one or more extents associated with the layout;

storing, for the client-side proxy, protocol state data for the first transport connection;

using the stored protocol state data indicating information about the layout granted to the client device for the first application protocol to predictively accelerate at least one message payload exchange based on the one or more extents associated with the layout using the second application protocol over the second transport connection;

determining if any message payloads in the first protocol invalidate predicted transactions or messages; and if it is determined that a message payload in the first protocol invalidates a predicted transaction or message, unwinding the predicted transaction or message.

\* \* \* \* \*